United States Patent
Reithmeier

(10) Patent No.: US 6,488,385 B2
(45) Date of Patent: Dec. 3, 2002

(54) DEVICE FOR SHADOWLESS BACKLIGHTING OF LARGE-AREA DISPLAYS

(75) Inventor: Michael Reithmeier, Eichenau (DE)

(73) Assignee: Patent-Treuhand-Gesellschaft fuer Elektrische Gluehlampen, Munich (DE)

( * ) Notice: Subject to any disclaimer, the term of this patent is extended or adjusted under 35 U.S.C. 154(b) by 0 days.

(21) Appl. No.: 09/733,987

(22) Filed: Dec. 12, 2000

(65) Prior Publication Data

US 2001/0004317 A1 Jun. 21, 2001

(30) Foreign Application Priority Data

Dec. 16, 1999 (DE) .......................... 199 60 728

(51) Int. Cl.⁷ ................................. F21V 7/04
(52) U.S. Cl. ................. 362/31; 362/555; 362/249; 362/252; 362/228; 362/800; 362/812; 40/431
(58) Field of Search ............ 362/31, 555, 559, 362/249, 252, 235, 800, 812, 228; 40/431, 573, 575

(56) References Cited

U.S. PATENT DOCUMENTS 5,412,893 A  *  5/1995  Aiken, Sr. ................... 40/518

FOREIGN PATENT DOCUMENTS

| DE | 25 27 711 | 1/1977 |
| DE | 38 03 951 | 8/1989 |
| DE | 94 11 065 | 12/1994 |
| DE | 44 15 457 | 11/1995 |
| DE | 198 17 479 | 6/1999 |
| DE | 198 17 476 | 11/1999 |

* cited by examiner

*Primary Examiner*—Stephen Husar
*Assistant Examiner*—Bertrand Zeade
(74) *Attorney, Agent, or Firm*—Robert F. Clark

(57) ABSTRACT

Device for shadowless backlighting of large-area displays comprising at least two two-dimensional main light sources which are each surrounded by a frame, at least two frame sections abutting one another. One or more auxiliary light sources are mounted at least on a part of the mutually abutting frame sections.

20 Claims, 2 Drawing Sheets

DEVICE FOR SHADOWLESS BACKLIGHTING OF LARGE-AREA DISPLAYS

TECHNICAL FIELD

The invention proceeds from a device for shadowless backlighting of large-area displays in accordance with the preamble of claim 1. In particular, these are advertising displays, for example for urban advertisements.

PRIOR ART

A device for shadowless backlighting of large-area displays has already been disclosed in DE-A 25 27 711. This is a small-area picture frame which can be designed as a so-called LUMEX luminous frame. In this case, however, use is made of large-volume light boxes with conventional fluorescent lamps which, however, have a temperature-dependent luminance which is so low that no pictures on normal paper can be used as object to be backlit. The light source used comprises one or more linear T2 fluorescent lamps arranged in parallel. Moreover, such fluorescent lamps have a relatively short service life of less than 15000 hours.

On the other hand, DE-A 198 17 476 discloses a fluorescent lamp based on dielectrically impeded discharges which is designed as a flat radiator with a frame. A similar technology is described in DE-A 198 17 479, it being possible for several flat radiators to abut one another with their frame parts and to be driven separately.

This concept of mutually abutting frame parts can be used in order to create large-area displays whose area should or cannot be covered by a single flat radiator. In the case of large-area displays, the aim in this case is to control the various flat radiators as a unit rather than separately. It is disadvantageous in this case that the frame parts surrounding the luminous areas act as a dark grid disturbing the overall homogeneous impression of the large area. In order to mitigate this darkening, diffusers have so far been proposed for distributing the light. However, it is attended by a considerable light loss.

DESCRIPTION OF THE INVENTION

It is the object of the present invention to provide a device for the most homogeneous backlighting possible of large-area displays in accordance with the preamble of claim 1, which device largely avoids light loss.

This object is achieved by means of the characterizing features of claim 1. Particularly advantageous refinements are to be found in the dependent claims.

The present invention permits the uniform backlighting of displays with high luminance. If several light sources (main light sources below) are joined to one another in order to backlight relatively large areas, this gives rise to the problem of the decline in luminance at the joint, formed by the frame, to the next light source. This joint can be bridged by fastening auxiliary light sources thereon. These can cover the joint as a whole or in a fashion oriented on the individual frame.

It is even possible now, on the basis of the high luminance achievable, to use paper pictures instead of the previously used, substantially more expensive so-called "Duratrans" pictures. In principle, any flat light source is suitable as main light source, for example linear, and/or meandering fluorescent lamps, or fluorescent lamps bent in the shape of a U.

It is advantageous to use two-dimensional fluorescent lamps based on dielectrically impeded discharges which permit a high luminous flux even at a low temperature, and which have a very long service life of approximately 30000 hours. It is thereby possible to achieve a flat design (order of magnitude of 12 mm installed depth) which is far superior to conventional meandering fluorescent lamps, or ones bent in the shape of a U.

According to the invention, the joint, which appears as a dark strip between two flat lamps or as a grid between arrays of flat lamps, can be avoided by mounting on the frame a separate auxiliary light source whose shape is adapted overall to the strip or the grid. Particularly suitable for this are thin elongated fluorescent lamps or neon lamps, or else, preferably one or more, preferably linearly arranged LEDs, in particular white LEDs. The latter have the advantage of a long service life which even exceeds that of flat fluorescent lamps based on dielectrically impeded discharges. The power supply of the LEDs can be implemented, for example, via the electronic ballast of the associated main light source, since a minimum voltage of 12 V is required here, in any case. It is thereby possible to implement luminous areas of any size, in particular for backlighting in the case of urban advertisements.

In detail, the device for shadowless backlighting of large-area displays comprises at least two two-dimensional main light sources which are each surrounded by a frame, at least two frame sections abutting one another. One or more auxiliary light sources are mounted at least on a part of the mutually abutting frame sections.

The main light sources are advantageously fluorescent lamps based on dielectrically impeded discharges; one or more LEDs form the auxiliary light sources.

A homogeneous overall impression is yielded when the luminances of the main and the auxiliary light sources differ from one another by less than 30%. The two types of light sources can be coordinated, for example, by virtue of the fact that the setting of the luminance is electronically controlled. Any differences in the luminances between the flat main light source and the auxiliary light source serving as frame illumination are preferably balanced virtually completely (to a difference of less than 10%) by appropriate electric or electronic filtering.

A cost effective alternative for achieving as homogeneous a luminance as possible in the case of a large area is to lay a common diffuser plate over all light sources.

In a particularly preferred embodiment, use is made of a linear sequence of several, typically 10 to 30, LEDs which can advantageously be arranged on a single printed circuit board.

The device can further comprise means, in particular at least one ballast, for operating the light sources. It holds in particular for LEDs as auxiliary light source that the operating voltage for operating at least the auxiliary light source can be tapped from the means for operating the main light source, mostly a ballast.

FIGURES

The invention is to be explained in more detail below with the aid of several exemplary embodiments. In the drawings:

FIG. 1 shows a large-area display,

FIG. 2 shows a section through the display of FIG. 1, and

FIG. 3 shows a further exemplary embodiment for a large-area display.

DESCRIPTION OF THE DRAWING

A large-area advertising display 1 for urban advertisements is shown in FIG. 1. Typical dimensions are 1.7×1.2 m². Use is made for backlighting of several two-dimensional fluorescent lamps 2 based on dielectrically impeded discharges, their typical size being 20×30 cm². They comprise a rectangular luminous area 8 which is surrounded by a frame 7.

Figure 1:
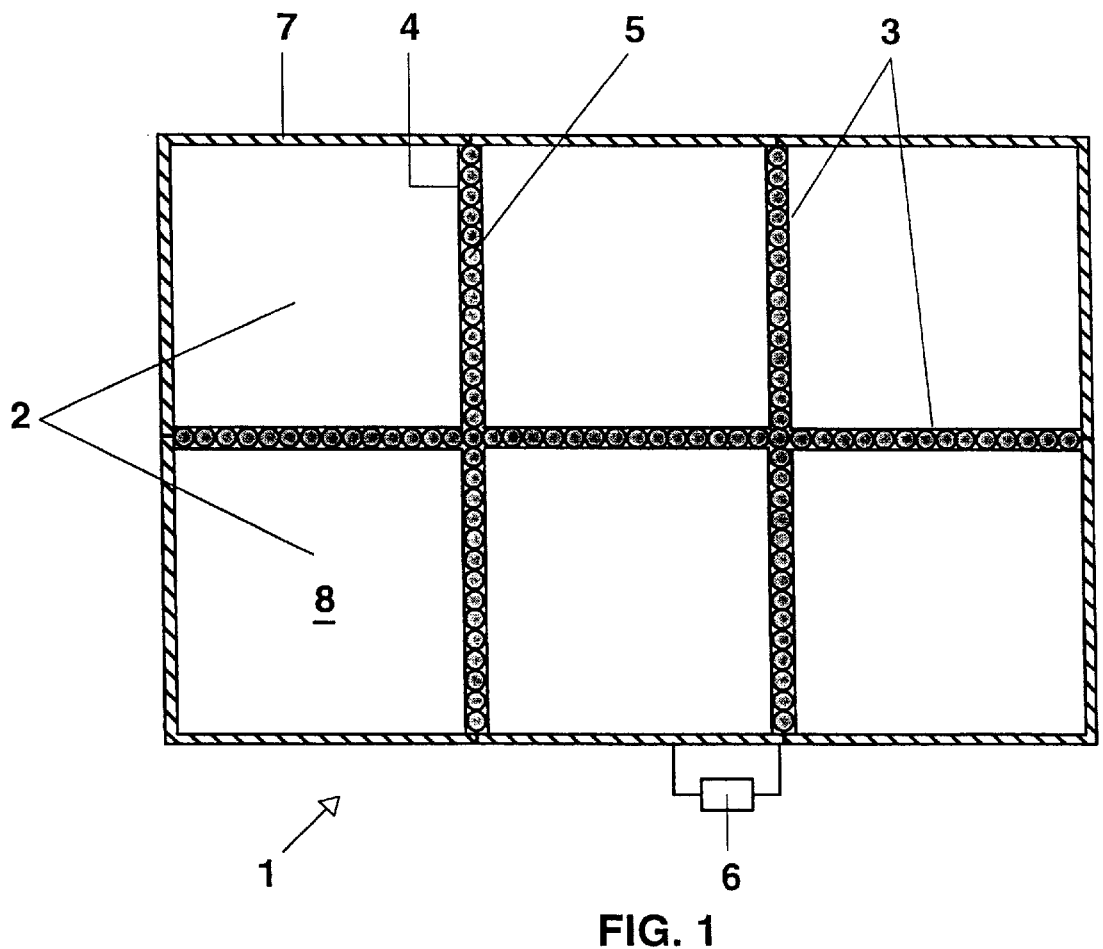

The dark joints 3 located between the luminous areas of the fluorescent lamps 2 are formed by the mutually adjacent circumferential frames 7 of the individual fluorescent lamps (formed from four frame sections). They each bear printed circuit boards 4 on which approximately 25 LEDs 5 per frame section are linearly juxtaposed (fewer LEDs are illustrated in the diagram). The luminance of the fluorescent lamps 2 and the LEDs 5 is controlled electronically (by means of an electronic ballast EVG 6) and tuned exactly to one another. It is approximately 15000 cd/m².

In another embodiment (FIG. 2), the luminances of the main light source and the auxiliary light source differ because an electronic control is dispensed with. The differing luminances of the two types of light source is, however, adjusted to 10% by a diffuser 10 laid over the entire display. This solution does reduce the luminance, but it is substantially more cost-effective since it saves the electronic control. This loss can be accepted in view of the fact that the luminance of a suitable main light source is substantially higher than with other implementations.

Figure 2:
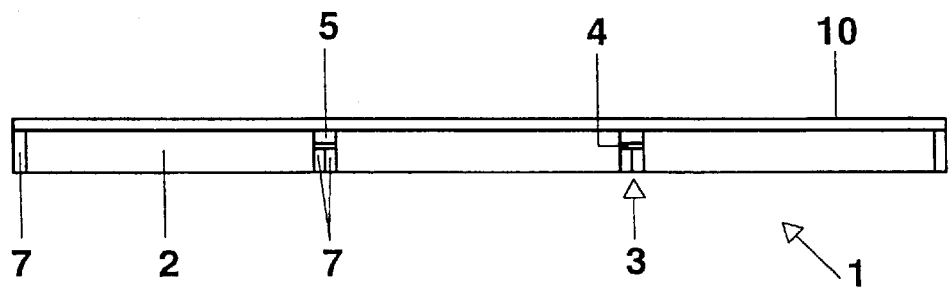

In detail, FIG. 2 shows that the joint 3 as a whole, that is to say over both frame parts 7 of recessed design, is covered by a printed circuit board 4 with LEDs 5.

Figure 3:
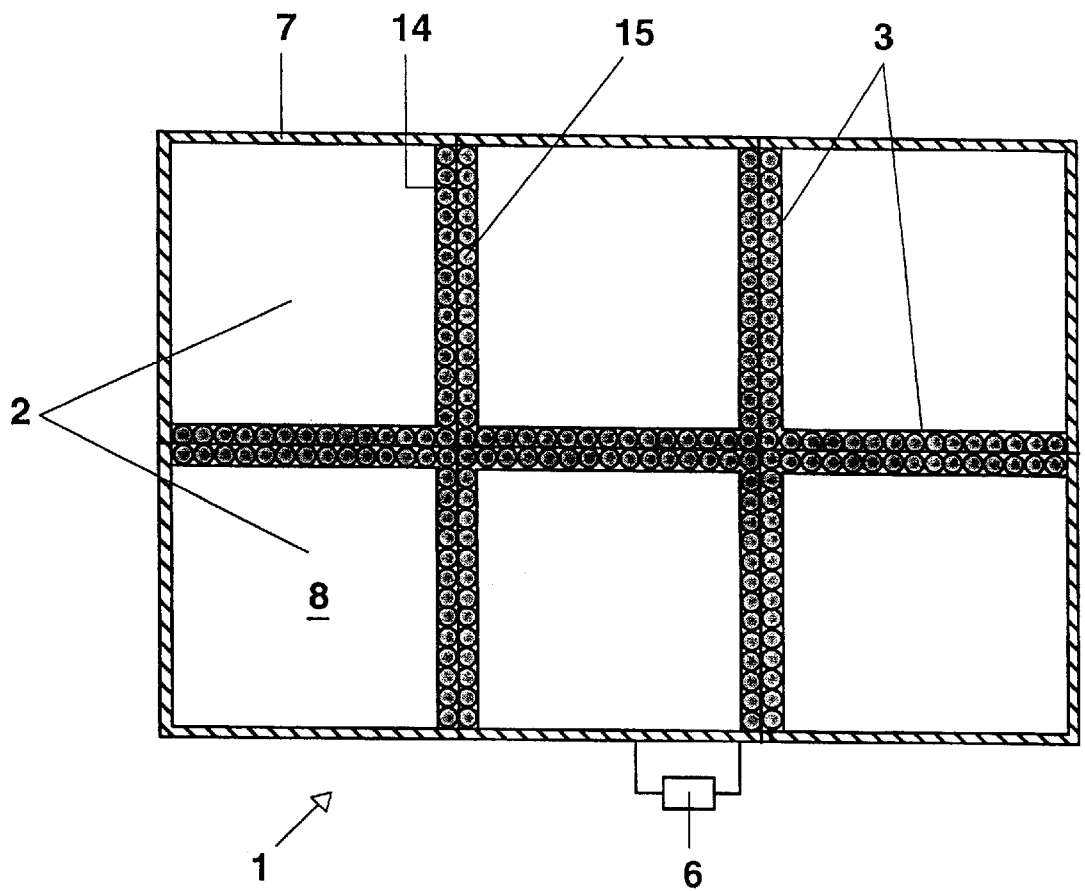

Another embodiment is shown in FIG. 3, in which the printed circuit board 14 with the LEDs 15 is assigned to each individual frame section 7.

In particular, the LEDs 15 of the two neighbouring frame parts 7 can be mutually offset in this case, in order to improve the uniformity of the luminance.

What is claimed is:

1. Device for shadowless backlighting of large area displays, comprising at least two two-dimensional main light sources (2) which are each surrounded by a frame (7), each frame having at least one frame section which mutually abuts a frame section of another frame, and one or more auxiliary light sources (5) mounted at least on a part of the mutually abutting frame sections.

2. Device according to claim 1, characterized in that the main light source is a fluorescent lamp based on dielectrically impeded discharges.

3. Device according to claim 1, characterized in that the auxiliary light source is one or more LEDs.

4. Device according to claim 1, characterized in that the luminances of the main and the auxiliary light sources differ from one another by less than 30%.

5. Device according to claim 4, characterized in that the setting of the luminance is electronically controlled.

6. Device according to claim 1, characterized in that a common diffuser plate (10) is laid over all light sources.

7. Device according to claim 1, characterized in that the device further comprises means, in particular at least one ballast (6), for operating the light sources.

8. Device according to claim 7, characterized in that the operating voltage for operating at least one auxiliary light source is tapped from the means for operating a main light source.

9. Device for shadowless backlighting of large-area displays, comprising at least four rectangular light sources having circumferential frames, the rectangular light sources being arranged in a grid pattern wherein mutually adjacent frame sections of the rectangular light sources abut each other, and an auxiliary light source arranged along the mutually adjacent frame sections.

10. The device according to claim 9 wherein the mutually adjacent frame sections are recessed to receive the auxiliary light source.

11. The device according to claim 9 wherein the auxiliary light source is one or more LEDs.

12. The device according to claim 9 wherein the rectangular light sources are fluorescent lamps having dielectrically impeded discharges.

13. The device according to claim 9 wherein the auxiliary light source is one or more elongated fluorescent lamps.

14. The device according to claim 9 wherein the auxiliary light source is one or more neon lamps.

15. The device according to claim 9 wherein the luminances of rectangular light sources and the auxiliary light source differ from one another by less than 30%.

16. Device for shadowless backlighting of large-area displays, comprising at least two two-dimensional main light sources, each main light source being joined to another main light source at a joint, and an auxiliary light source fastened to the joint.

17. The device according to claim 16 wherein the auxiliary light source covers the joint as a whole.

18. The device according to claim 16 wherein the auxiliary light source is one or more LEDs.

19. The device according to claim 17 wherein the auxiliary light source comprises a series of LEDs mounted on a circuit board.

20. The device according to claim 16 wherein the joint between the main light sources is recessed.

* * * * *